(12) United States Patent
Matsumoto

(10) Patent No.: US 11,040,579 B2
(45) Date of Patent: Jun. 22, 2021

(54) PNEUMATIC TIRE AND STUD PIN

(71) Applicant: The Yokohama Rubber Co., LTD., Tokyo (JP)

(72) Inventor: Kenichi Matsumoto, Hiratsuka (JP)

(73) Assignee: The Yokohama Rubber Co., LTD.

( * ) Notice: Subject to any disclaimer, the term of this patent is extended or adjusted under 35 U.S.C. 154(b) by 236 days.

(21) Appl. No.: 15/762,540

(22) PCT Filed: Sep. 28, 2016

(86) PCT No.: PCT/JP2016/078648
§ 371 (c)(1),
(2) Date: Mar. 22, 2018

(87) PCT Pub. No.: WO2017/061316
PCT Pub. Date: Apr. 13, 2017

(65) Prior Publication Data
US 2019/0077202 A1   Mar. 14, 2019

(30) Foreign Application Priority Data

Oct. 7, 2015   (JP) .............................. JP2015-199677

(51) Int. Cl.
*B60C 11/16*   (2006.01)
*B60C 1/00*   (2006.01)
(Continued)

(52) U.S. Cl.
CPC ........ *B60C 11/1625* (2013.01); *B60C 1/0016* (2013.01); *B60C 11/032* (2013.01);
(Continued)

(58) Field of Classification Search
CPC ............. B60C 11/1643; B60C 11/1675; B60C 11/1637
See application file for complete search history.

(56) References Cited

U.S. PATENT DOCUMENTS

| 2004/0163746 A1* | 8/2004 | Eromaki | B29D 30/66 |
| | | | 152/210 |
| 2013/0000807 A1* | 1/2013 | Pons | B60C 11/1643 |
| | | | 152/210 |
| 2017/0069075 A1 | 3/2017 | Okuda | |

FOREIGN PATENT DOCUMENTS

DE          28 04 939       8/1979
DE     10 2014 012 988      4/2015
(Continued)

OTHER PUBLICATIONS

International Search Report for International Application No. PCT/JP2016/078648 dated Dec. 27, 2016, 2 pages, Japan.
(Continued)

*Primary Examiner* — Robert C Dye
*Assistant Examiner* — Farah Taufiq
(74) *Attorney, Agent, or Firm* — Thorpe North & Western

(57) ABSTRACT

A stud pin for mounting in a pneumatic tire includes a tip including a tip end surface configured to come into contact with a road surface, and a body portion configured to house the tip. An end surface of the tip configured to come into contact with a road surface comprises an axis of symmetry which defines a line symmetrical shape of the end surface; a centroid of a shape of the end surface offset to a first side in an axial direction from a center position of a range the end surface covers in the axial direction of the axis of symmetry; and a recessed portion recessed inward of the end surface, the recessed portion being provided on, of peripheries of the end surface, a periphery of the end surface running between a first most distal end portion and a second most distal end portion.

23 Claims, 6 Drawing Sheets

(51) Int. Cl.
    *B60C 11/03* (2006.01)
    *B60C 11/12* (2006.01)
(52) U.S. Cl.
    CPC ......... *B60C 11/1236* (2013.01); *B60C 11/16* (2013.01); *B60C 11/1637* (2013.01); *B60C 11/1643* (2013.01); *B60C 11/1675* (2013.01); *B60C 2011/1209* (2013.01)

(56) References Cited

FOREIGN PATENT DOCUMENTS

| EP | 2145777 | | 1/2010 | | |
|---|---|---|---|---|---|
| EP | 2977231 | A1 * | 1/2016 | ......... | B60C 11/1675 |
| JP | 2012-180012 | | 9/2012 | | |
| JP | 2012180012 | A * | 9/2012 | ......... | B60C 11/1675 |
| JP | 2014-012455 | | 1/2014 | | |
| JP | 2015058787 | | 3/2015 | | |
| JP | 2015-136942 | | 7/2015 | | |
| WO | WO2008130275 | | 10/2008 | | |
| WO | WO 2012/117962 | | 9/2012 | | |
| WO | WO 2014/006857 | | 1/2014 | | |
| WO | WO 2014/122570 | | 8/2014 | | |

OTHER PUBLICATIONS

European Office Action for European Application No. 18838703.9 dated Nov. 25, 2020, 17 pages, Germany.
Daniel Yapi, et al., A Learning-Based Approach for Automatic Defect Detection in Textile Images, IFAC-PapersOnline, vol. 48, No. 3, 2015, pp. 2423-2428, 6 pages, Canada.
Jason Brownlee, Image Augmentation for Deep Learning With Keras—Machine Learning Mastery, online, URL:https://web.archive.org/web/20170711043635/https://machinelearningmastery.com/image-augmentation-deep-learning-keras, retrieved Nov. 2, 2020, 28 pages, Australia.
Li Yi et al., An End-to-End Steel Strip Surface Defects Recognition System Based on Convolutional Neural Networks, Steel Research International, Feb. 2016, vol. 88, No. 2, 12 pages, Germany.

* cited by examiner

2

PNEUMATIC TIRE AND STUD PIN

TECHNICAL FIELD

The present technology relates to a stud pin for mounting in a tread portion of a pneumatic tire, and a pneumatic tire mounted with the stud pin.

BACKGROUND ART

Conventional snow tires provide grip on icy road surfaces via stud pins mounted in the tread portion of the tire.

Typically, stud pins are embedded in stud pin installation holes provided in the tread portion. When stud pins are embedded in a stud pin installation hole, by inserting stud pins into stud pin installation holes with an expanded diameter, the stud pins are firmly embedded in the stud pin installation holes. This prevents the stud pins from falling out from the stud pin installation holes when receiving breaking or accelerating forces or lateral forces from the road surface when the tire rolls.

The shape of end surface of the end tip of some conventional stud pins has been circular. In recent years, technology has been proposed in which the end tip has a polygonal shape such as a quadrangular shape to increase edge components. Additionally, by enlarging the end surface shape of the end tip, performance on ice can be improved. However, by increasing the edge components, the size of the shape of the end surface is increased, thus increasing the weight of the stud pin. As a result, the road surface becomes more susceptible to wear.

For example, a tire is known that is provided with a stud pin (tip) with a pin that is asymmetrical, in a plan view, at least with respect to one axis and has the configuration described below (International Patent Application Publication No. WO 2014/122570).

Specifically, a first side surface of the pin (tip) has a profile on which at least one tip is defined, and a second side surface opposite the first side surface that has a substantially planar profile. The shape of the end surface of the pin is a concave seven-sided polygon. The tip of the first side surface is provided on the tire to face the direction opposite to the advancement direction of the tire (International Patent Application Publication No. WO 2014/122570).

A stud pin with a pin such as that described above can provide increased driving performance on icy and snowy road surfaces, but cannot provide excellent performance on ice and reduced road surface wear.

SUMMARY

The present technology provides a stud pin and a pneumatic tire that can provide a vehicle with excellent performance on ice and reduce road surface wear.

One aspect of the present technology is a pneumatic tire with a designated tire rotation direction, the pneumatic tire including a tread portion with a stud pin mounted in the tread portion.

The stud pin includes a tip including an end surface having a line symmetrical shape, the end surface being configured to come into contact with a road surface, and a body portion configured to secure the tip thereto;

the end surface of the tip configured to come into contact with a road surface including an axis of symmetry which defines the line symmetrical shape, a centroid of a shape of the end surface offset to a first side in an axial direction of the axis of symmetry from a center position of a range the end surface covers in the axial direction, and a recessed portion recessed inward of the end surface, the recessed portion being provided on a periphery of the end surface running between a first most distal end portion and a second most distal end portion, the first most distal end portion being located on the axis of symmetry of the end surface farthest from the centroid on the first side and the second most distal end portion being located on the axis of symmetry of the end surface farthest from the centroid on a second side opposite the first side; and the stud pin being mounted such that the second side, as opposed to the first side, corresponds to a leading side in a tire rotation direction.

Another aspect of the present technology is a stud pin for mounting in a tread portion of a pneumatic tire. The stud pin includes a tip including an end surface configured to come into contact with a road surface, and a body portion configured to secure the tip thereto;

an end surface of the tip configured to come into contact with a road surface including an axis of symmetry which defines a line symmetrical shape of the end surface, a centroid of a shape of the end surface offset to a first side in an axial direction of the axis of symmetry from a center position of a range the end surface covers in the axial direction, and a recessed portion recessed inward of the end surface, the recessed portion being provided on a periphery of the end surface running between a first most distal end portion and a second most distal end portion, the first most distal end portion being located on the axis of symmetry of the end surface farthest from the centroid on the first side and the second most distal end portion being located farthest from the centroid on a second side opposite the first side.

Preferably, a second length of the periphery of the end surface on the second side with respect to a bottom of the recessed portion is less than a first length of the periphery of the end surface on the first side with respect to the bottom of the recessed portion.

Preferably, a first maximum width in a direction orthogonal to the axial direction of a portion of the end surface on the first side with respect to the bottom of the recessed portion is greater than a second maximum width in the direction orthogonal to the axial direction of a portion of the end surface on the second side with respect to the bottom of the recessed portion.

Preferably, a first area of the portion of the end surface on the first side with respect to the bottom of the recessed portion is greater than a second area of the portion of the end surface on the second side with respect to the bottom of the recessed portion.

Preferably, a position in the axial direction of the bottom of the recessed portion is located on the second side of the centroid.

Preferably, a periphery shape of the end surface on the first side with respect to the recessed portion includes a first orthogonal line segment orthogonal to the axial direction; and a periphery shape of the end surface on the second side with respect to the recessed portion includes a second orthogonal line segment orthogonal to the axial direction with a length less than that of the first orthogonal line segment, or does not comprise the second orthogonal line segment.

Preferably, a first periphery shape of the end surface on the first side with respect to the bottom of the recessed portion has a shape partially identical to an enlarged shape that is enlarged, by a predetermined scale factor, from second periphery shape of the end surface on the second side with respect to the bottom of the recessed portion.

Preferably, the first periphery shape or the enlarged shape is a perfect circle, an ellipse, or a portion of a polygon.

Preferably, a distance L1 from a position in the axial direction of the bottom of the recessed portion to the first most distal end portion and a distance L2 from a position in the axial direction of the bottom of the recessed portion to the second most distal end portion have a ratio L1/L2 ranging from 1.0 to 5.0.

Preferably, the body portion includes an upper end surface having a line symmetrical shape provided such that the tip projects therefrom; and the upper end surface includes an upper end surface axis of symmetry which defines the line symmetrical shape, an upper end surface centroid of a shape of the upper end surface offset to the first side from a center position of a range the upper end surface covers in an axial direction of the upper end surface axis of symmetry, and an upper end surface recessed portion recessed inward of the upper end surface, the upper end surface recessed portion being provided on a periphery of the upper end surface running between a third most distal end portion and a fourth most distal end portion of the periphery of the upper end surface, the third most distal end portion being located on the upper end surface axis of symmetry farthest from the upper end surface centroid on the first side and the fourth most distal end portion being located on the upper end surface axis of symmetry farthest from the upper end surface centroid on the second side.

The stud pin and the pneumatic tire of the aspects described above can provide a vehicle with excellent performance on ice and reduce road surface wear.

DETAILED DESCRIPTION

Overall Description of Tire

Figure 1:
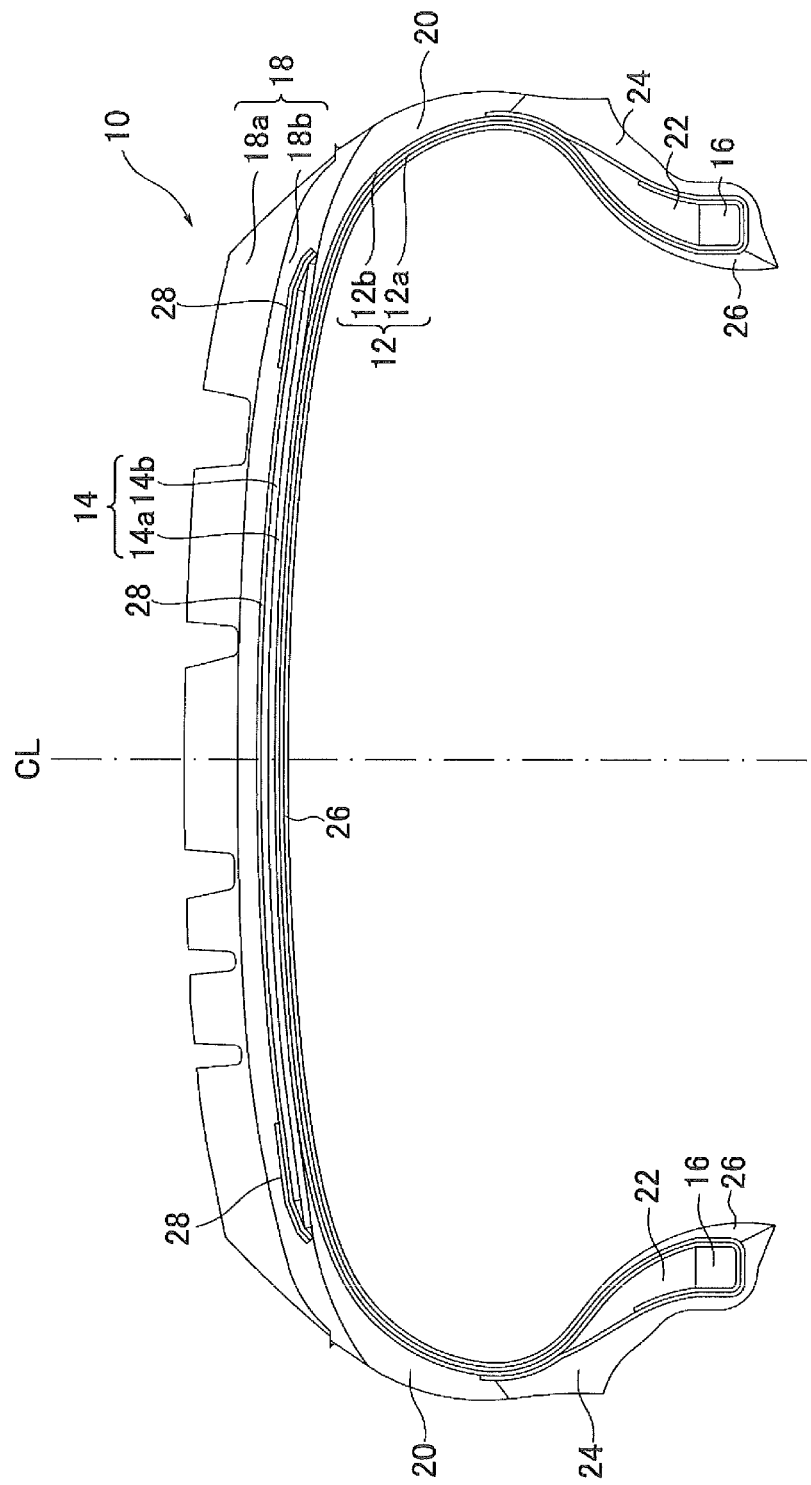
FIG. 1 is a tire cross-sectional view illustrating an example of a cross section of a pneumatic tire of an example embodiment.

Below, a pneumatic tire of an embodiment is described. FIG. 1 is a tire cross-sectional view illustrating an example of a cross section of a pneumatic tire (hereinafter referred to as "tire") 10 of the embodiment. The tire 10 is a studded tire with a tread portion in which stud pins are embedded. FIG. 1 illustrates a state without stud pins.

The tire 10 is, for example, a tire for a passenger vehicle. A tire for a passenger vehicle refers to a tire specified in Chapter A of the JATMA Year Book 2012 (standards of The Japan Automobile Tyre Manufacturers Association, Inc.). The tire can also be a small truck tire specified in Chapter B or a truck tire or bus tire defined according to Chapter C.

Below, values of the dimensions of various pattern elements are described in detail as example values for a tire for a passenger vehicle. However, the pneumatic tire is not limited to these example values.

"Tire circumferential direction" described below refers to the direction (both directions) the tread surface rotates when the tire 10 rotates about the tire rotation axis. "Tire radial direction" refers to the direction that extends radially orthogonal to the tire rotation axis. "Outward in the tire radial direction" refers to the direction away from the tire rotation axis in the tire radial direction. "Tire lateral direction" refers to the direction parallel to the tire rotation axis direction. "Outward in the tire lateral direction" refers to the directions away from a tire centerline CL of the tire 10.

Tire Structure

The tire 10 includes a carcass ply layer 12, a belt layer 14, and bead cores 16 as framework members. The tire 10 mainly includes a tread rubber member 18, side rubber members 20, bead filler rubber members 22, rim cushion rubber members 24, and an innerliner rubber member 26 around the framework members.

The carcass ply layer 12 includes carcass ply members 12a, 12b that are formed from organic fibers covered with rubber and that are wound between the pair of bead cores 16 of an annular shape so as to be formed into a toroidal shape. In the tire 10 illustrated in FIG. 1, the carcass ply layer 12 is made of the carcass ply members 12a and 12b, but may also be made of a single carcass ply member. The belt layer 14 is provided outward of the carcass ply layer 12 in the tire radial direction, and is constituted by two belt members 14a, 14b. The belt layer 14 is a member formed from steel cords covered with rubber, the steel cords being arranged inclined at a predetermined angle, for example, 20 to 30 degrees, with respect to the tire circumferential direction. The width in the tire lateral direction of the belt member 14a that is a lower layer is greater than the width of the belt member 14b that is the upper layer. The inclination direction of the steel cords of the two layers of the belt members 14a and 14b are inclined from the tire circumferential direction toward the tire lateral direction in mutually different directions. As such, the belt members 14a, 14b are crossing layers serving to suppress expansion of the carcass ply layer 12 due to the pressure of the air.

The tread rubber member 18 is disposed outward of the belt layer 14 in the tire radial direction. Both end portions of the tread rubber member 18 connect to the side rubber members 20 to form the sidewall portions. The tread rubber member 18 is made of two layers of rubber members, namely an upper layer tread rubber member 18a provided on the outer side in the tire radial direction and a lower layer tread rubber member 18b provided on the inner side in the tire radial direction. The rim cushion rubber members 24 are provided at the inner ends of the side rubber members 20 in the tire radial direction and come into contact with a rim on which the tire 10 is mounted. The bead filler rubber members 22 are provided on the outer side of the bead cores 16 in the tire radial direction so as to be interposed between a portion of the carcass ply layer 12 prior to being wound around the bead cores 16 and a portion of the carcass ply layer 12 after being wound around the bead cores 16. The innerliner rubber member 26 is provided on the inner surface of the tire 10 facing a tire cavity region that is filled with air and is surrounded by the tire 10 and the rim.

In addition, the tire 10 includes a belt cover layer 28 formed from organic fiber covered with rubber that covers the belt layer 14 from the outer side in the tire radial direction of the belt layer 14.

The tire 10 has such a tire structure, but the structure of the pneumatic tire according to the present embodiment is not limited to the tire structure illustrated in FIG. 1.

Tread Pattern

Figure 2:
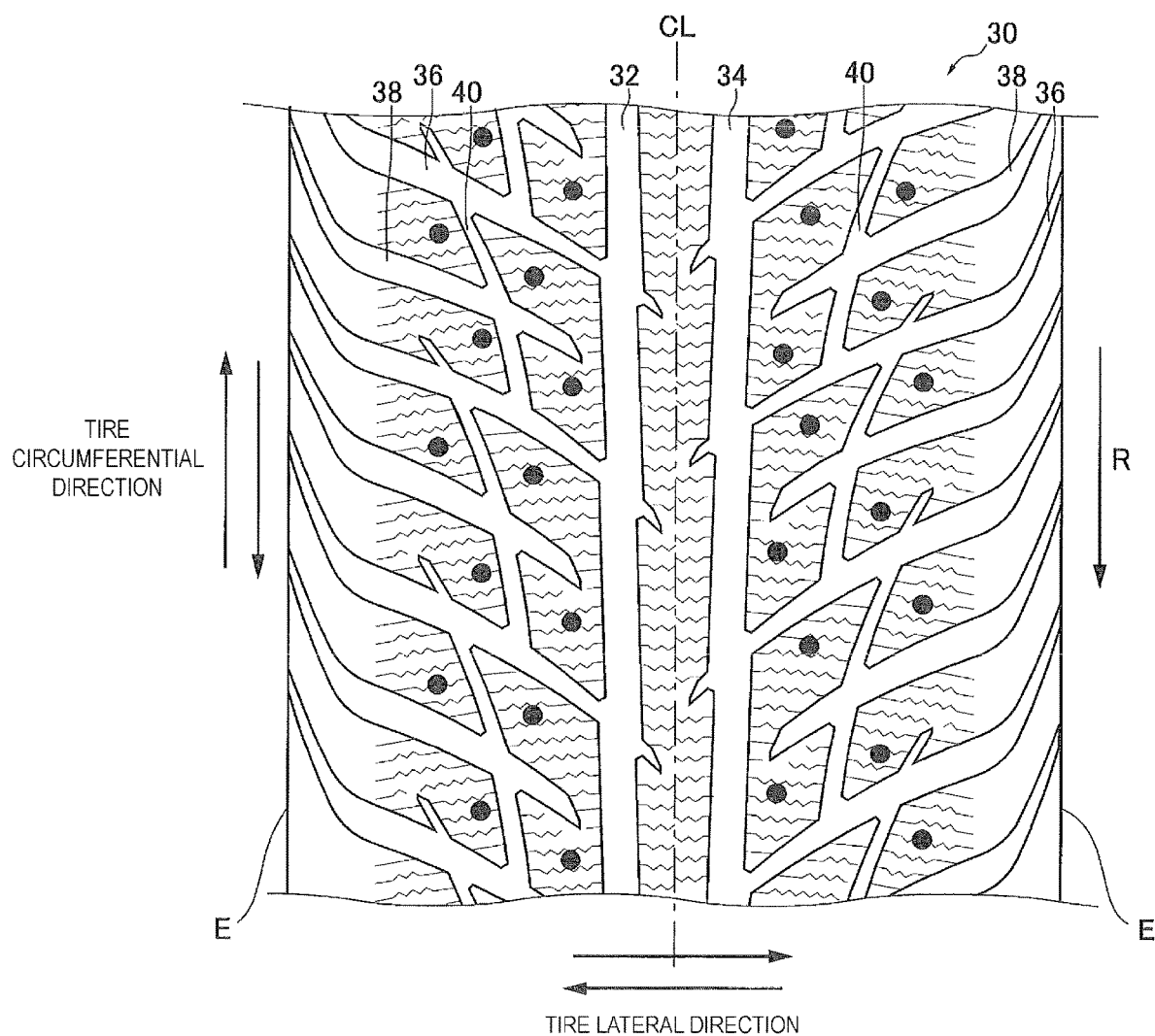
FIG. 2 is a developed plan view of a portion of an example of a tread pattern of the tire of an example embodiment, developed on a plane.

FIG. 2 is a planar development diagram illustrating a portion of an example of the tread pattern, namely a tread pattern 30, of the tire 10 developed on a plane. As illustrated in FIG. 2, the tire 10 has a first orientation in the tire circumferential direction designated by rotation direction R. Orientation information of the rotation direction R is shown by an information display portion including numbers, symbols, and the like on the sidewall surface of the tire 10. In FIG. 2, stud pins mounted in the tread portion are omitted from the drawing. The stud pins (see FIG. 3A) are mounted in pin installation holes (black dot portions in FIG. 2) illustrated in FIG. 2.

The tread pattern 30 includes circumferential main grooves 32, 34, a first inclined groove 36, a second inclined groove 38, and a third inclined groove 40. A plurality of the first inclined grooves 36, a plurality of the second inclined grooves 38, and a plurality of the third inclined grooves 40 are each formed at predetermined intervals in the tire circumferential direction (the vertical direction in FIG. 2).

The circumferential main grooves 32, 34 are disposed an equal distance outward from the tire centerline CL in the tire lateral direction and extend in a linear manner in the tire circumferential direction.

The first inclined groove 36 extends from a region of a tire land portion between the circumferential main grooves 32, 34 in the direction (upward in FIG. 2) opposite the tire rotation direction R, which is one direction in the tire circumferential direction, and outward in the tire lateral direction. The first inclined groove 36 extends to a tire shoulder region of the tread portion gradually increasing in groove width, sharply changes in inclination angle in the shoulder region, then extends in the tire circumferential direction, specifically the direction opposite the tire rotation direction R, ending at a pattern end E.

The second inclined groove 38 extends from a region of a land portion located outward of the circumferential main grooves 32, 34 in the tire lateral direction in the direction (upward in FIG. 2) opposite the tire rotation direction R and outward in the tire lateral direction. The second inclined groove 38 is formed parallel to the first inclined groove 36. The second inclined groove 38 extends to the tire shoulder region of the tread portion gradually increasing in groove width, sharply changes in inclination angle in the shoulder region, then extends in the tire circumferential direction, specifically the direction opposite the tire rotation direction R, ending at the pattern end E. The second inclined groove 38 is disposed between two of the first inclined grooves 36 adjacent in the tire circumferential direction.

The third inclined groove 40 extends from partway along the first inclined groove 36 and passes through the second inclined groove 38 adjacent to the first inclined groove 36 in the tire circumferential direction, and passes through the first inclined groove 36 adjacent to the second inclined groove 38 in the tire circumferential direction, closing in the tire shoulder region. The third inclined groove 40 extends in the direction (upward in FIG. 2) opposite the tire rotation direction R, which is one direction in the tire circumferential direction, and outward in the tire lateral direction.

In the tread pattern 30, stud pins 50 described below are mounted in stud pin installation holes (black dot portions in FIG. 2).

The circumferential main grooves 32, 34, the first inclined grooves 36, the second inclined grooves 38, and the third inclined grooves 40 have groove depths ranging from, for example, 8.5 to 10.5 mm, and groove widths of a maximum of 12 mm. The tread pattern illustrated in FIG. 2 is an example, and the tread pattern of the tire in which the stud pins of the embodiments described below are mounted in is not limited to the embodiment illustrated in FIG. 2.

Stud Pin

Figure 3A:
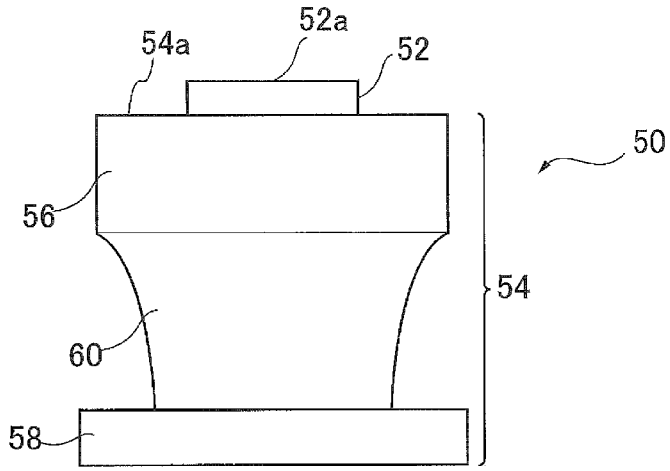
FIGS. 3A to 3C are diagrams illustrating an example of a stud pin of an example embodiment.
Figure 3B:
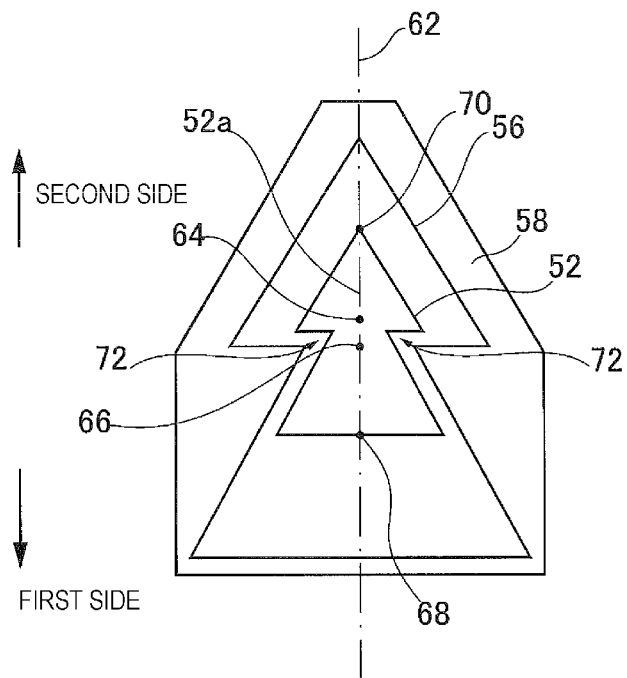
Figure 3C:
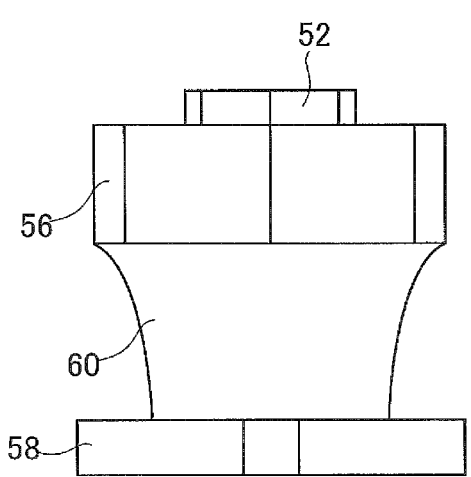

FIG. 3A is a front view of the stud pin 50 of an embodiment. FIG. 3B is a plan view of the stud pin 50. FIG. 3C is a side view of the stud pin 50 of FIG. 3B as viewed from the upper side relative to the paper.

The stud pin 50 includes a tip 52 and a body portion 54. The tip 52 includes an end surface 52a that comes into contact with a road surface. The tip 52 is formed from tungsten carbide or a similar hard metal. Additionally, the tip 52 may be formed from a cermet material. The tip 52 is fit and fixed in a hole provided in the upper end surface of the body portion 54. The tip 52 of the stud pin 50 is configured to project from the tread surface when the stud pin 50 is mounted in the tire 10.

The body portion 54 extends in one direction, and is the portion that fixes the stud pin 50 to the tire 10 by coming into contact with a side wall of a tread rubber of the pin installation hole and being squeezed by the tread rubber when mounted in the tire 10. The body portion 54 includes an upper flange 56, a lower flange 58, and a shank 60. The lower flange 58 is shaped like a flange to fit a hole bottom portion with a large width provided in a bottom portion of the pin installation hole. The upper flange 56 is shaped like a flange and is provided on an end of the shank 60, which extends from the lower flange 58. An upper end surface 54a is formed on an upper end of the upper flange 56. The upper end surface 54a is formed to be flush with the tread surface when mounted in the tire 10. Material of the body portion 54 is not particularly limited and, for example, the body portion 54 may be formed from aluminum alloy or the like in order to reduce the weight of the stud pin 50.

The end surface 52a of the tip 52 of the stud pin 50 that comes into contact with the road surface includes the following. As illustrated in FIG. 3B, the end surface 52a includes an axis of symmetry 62 which defines the line symmetrical shape of the end surface 52a, and a centroid 66 of the shape of the end surface 52a offset to a first side in the axial direction from a center position 64 on the axis of symmetry 62 of the range the end surface 52a covers in the axial direction of the axis of symmetry 62.

Additionally, the end surface 52a includes a first most distal end portion 68 located on the axis of symmetry 62 of the end surface 52a farthest from the centroid 66 on the first side, and a recessed portion 72 provided on the periphery of the end surface running between the first most distal end portion 68 and a second most distal end portion 70, the recessed portion 72 being recessed inward of the end surface 52a, and the second most distal end portion 70 being located on the axis of symmetry 62 of the end surface 52a farthest from the centroid 66 on a second side opposite the first side. The recessed portions 72 are provided on both side of the axis of symmetry 62.

The shape of the end surface 52a includes a first portion on the first side with respect to a bottom of the recessed portion 72 which is larger than a second portion on the second side with respect to the bottom of the recessed portion 72.

A vehicle on which the tire is mounted is provided with an antilock brake system (ABS) for preventing skidding on road surfaces. When the vehicle brakes, the ABS operates to control the braking such that the tire cycles between short bursts of locking and rotation in relation to the road surface.

Accordingly, by the second most distal end portion 70 side (second side) of the end surface 52a aligning with the leading side of the rotation direction R of the tire 10, when the tire 10 rotates under the operation of the ABS, the tip 52 moves relative to the icy road surface allowing the second portion of the tip 52, which is smaller, to make it easier to dig into the icy road surface. When locking under the operation of the ABS, the tip 52 moves relative to the icy road surface allowing the first portion of the tip 52, which is larger, to scrape against the icy road surface and generate larger resistance. In other words, the first portion of the tip 52 has a larger size than the second portion to increase the ability to catch on the icy road surface. The second portion of the tip 52 has a smaller size than the first portion to make it easier to dig into the ice in an icy road surface.

In this manner, in the present embodiment, the shape of the second side is small to make it easier for the tip 52 to dig into the icy road surface, and the shape of the first side is large to increase the ability of the tip 52 to catch on the icy road surface. In other words, in the tip 52, the end surface 52a has shapes of different sizes on the first side and the second side to correspond to the short bursts of locking and rotation described above.

Figure 4:
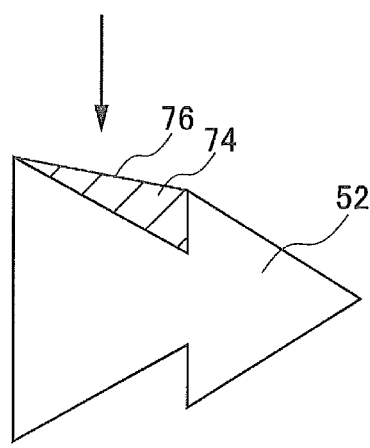
FIG. 4 is a diagram illustrating a recessed portion provided on a tip of the stud pin of an example embodiment filled with ice shavings.

In tire 10, when cornering or wiping action takes place, the tread surface tries to move in the tire lateral direction relative to the road surface. Specifically, when the road surface friction coefficient of the icy road surface is low, the tip 52 is likely to skid slightly in the tire lateral direction relative to the icy road surface. In this case, the tip 52 moves while scraping the ice, with the scraped off ice collecting in the recessed portion 72 of the tip 52. Thus, the recessed portion 72 is filled with scraped off ice shavings. FIG. 4 is a diagram illustrating the recessed portion 72 filled with ice shavings. The arrow in the diagram indicates the direction the icy road surface moves relative to the tip 52. By the ice shavings 74 collecting in the recessed portion 72, the tip 52 is provided with another wall surface 76. The wall surface 76 also functions to scrape the icy road surface. Accordingly, the tip 52 catches more on the icy road surface and resistance is increased.

Additionally, the tip 52 includes the recessed portion 72 to suppress an increase in the volume of the tip 52. Suppressing an increase in the volume of the tip 52 reduces the mass of the tip 52. Thus, the energy of the tip 52 hitting the road surface and damaging the road surface is reduced. As a result, the tip 52 including the recessed portion 72 can suppress road surface wear.

Accordingly, the stud pin 50 including the tip 52 can provide a vehicle with excellent performance on ice and reduce road surface wear.

In the tip 52, a second length of the periphery of the end surface 52a on the second side with respect to a bottom of the recessed portion 72 is preferably shorter than a first length of the periphery of the end surface 52a on the first side with respect to the bottom of the recessed portion 72.

Herein, "periphery of the end surface 52a on the first side with respect to a bottom of the recessed portion 72" refers to, of two peripheries connecting the each of a pair of most recessed bottoms of the recessed portion 72 on both sides, the periphery that passes through the first most distal end portion 68; and "periphery of the end surface 52a on the second side with respect to the bottom of the recessed portion 72" refers to the other periphery that passes through the second most distal end portion 70. Accordingly, the first length, and the second length refers to the lengths of the peripheries that pass through the first most distal end portion 68 and the second most distal end portion 70, respectively, from one of the pair of most recessed bottoms of the recessed portion 72 on both sides to the other. Herein, each of the "bottoms" refers to a position on a profile line between two points furthest away from a tangential line that touches at least two points on the profile line of the end surface 52a, the tangential line being a straight line inclined with respect to the axis of symmetry 62 of the tip 52 by ±30 degrees.

Additionally, in the tip 52, a first maximum width in the direction orthogonal to the axial direction of the axis of symmetry 62 of the first portion of the end surface 52a on the first side with respect to the bottom of the recessed portion 72 is preferably greater than a second maximum width in the direction orthogonal to the axial direction of the axis of symmetry 62 of the second portion of the end surface 52a on the second side with respect to the bottom of the recessed portion 72. Herein, "first portion" refers to a portion on the first side defined by the positions of the pair of most recessed bottoms of the recessed portions 72 on both sides, and "second portion" refers to a portion on the second side defined by the positions of the pair of most recessed bottoms of the recessed portions 72 on both sides. By the first maximum width being greater than the second maximum width, the effect of the first portion scraping the icy road surface and generating a large resistance can be increased; and the effect of the second portion digging into the icy in an icy road surface can be increased.

Note that in the foregoing, the movement of the tip 52 during cycles of short bursts of locking and rotation when the ABS is active was described. However, when the vehicle is stopped or taking off, the effects of the tip 52 described above is displayed. Also, when the vehicle is traveling at a constant speed, the effects of the tip 52 described above are displayed as drive is generated at the leading side portion of the contact patch of the tread portion and braking at the trailing side portion.

A first area of the first portion of the end surface 52a on the first side with respect to the bottom of the recessed portion 72 is preferably larger than a second area of the second portion of the end surface 52a on the second side with respect to the bottom of the recessed portion 72.

Additionally, the position of the bottom of the recessed portion 72 in the axial direction of the axis of symmetry 62 is preferably located on the second side of the centroid 66.

Preferably, a periphery shape of the end surface 52a on the first side with respect to the bottom of the recessed portion 72 includes a first orthogonal line segment that is orthogonal to the axial direction of the axis of symmetry 62, and a periphery shape of the end surface 52a on the second side with respect to the bottom of the recessed portion 72 does not include a second orthogonal line segment that is orthogonal to the axial direction of the axis of symmetry 62 or includes the second orthogonal line segment, with the length of the second orthogonal line segment being less than the length of the first orthogonal line segment. Herein, "orthogonal line segment" refers to a side along a straight line extending in the direction orthogonal to the axial direction of the axis of symmetry 62. Accordingly, the second side aligning with the leading side of the rotation direction R of the tire 10 increases the ability to catch on the icy road surface.

Preferably, in the end surface 52a of the tip 52, the periphery shape of the first portion of the end surface 52a on the first side with respect to the bottom of the recessed portion 72 has partially the same shape as an enlarged shape that is enlarged by a predetermined scale factor from the periphery shape of the second portion of the end surface 52a on the second side with respect to the bottom of the recessed portion 72. In the example illustrated in FIG. 3B, the second portion has a triangular shape, and the first portion has a triangular shape without an end portion containing a vertex, i.e., a trapezoidal shape. The shape of the end surface 52a is such that the enlarged shape of one of the two shapes partially matches the shape of the other. In other words, of the two similar triangular shapes, the larger triangular shape with a portion containing a vertex removed, i.e., a trapezoidal shape, may be joined to the smaller triangular shape forming a line symmetrical shape.

The periphery shape and the enlarged shape of the first portion is, for example, preferably a perfect circle, an ellipse, or a portion of a polygon. FIGS. 5A to 5K are diagrams illustrating example shapes of the end surface 52a of the tip 52 of the embodiment. The polygon is preferably a triangle, a quadrangular, a pentagon, or a hexagon.

Figure 6:
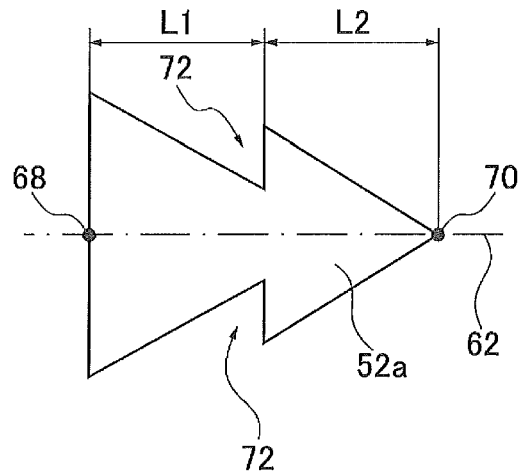
FIG. 6 is a diagram for describing distances of the tip used for the stud pin of an example embodiment.

Additionally, a distance L1 from a position in the axial direction of the axis of symmetry 62 of the bottom of the recessed portion 72 to the first most distal end portion 68 and a distance L2 from a position in the axial direction of the axis of symmetry 62 of the bottom of the recessed portion 72 of the end surface 52a to the second most distal end portion 70 preferably have the ratio L1/L2 ranging from 1.0 to 5.0. FIG. 6 is a diagram for describing the distances L1, L2. When the ratio L1/L2 is less than 1.0, the centroid 66 is too close to the second side. This makes it easier for the second portion of the tip 52 to dig into the road surface and increases road surface wear. When the ratio L1/L2 is greater than 5.0, the centroid 66 is too close to the first side. As a result, the effect of scraping the icy road surface and generating a large resistance is not sufficiently obtained. The ratio L1/L2 preferably ranges from 1.5 to 3.0.

Figure 7:
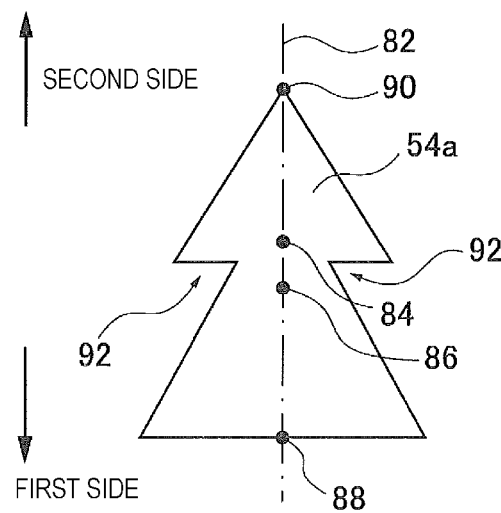
FIG. 7 is a diagram for describing an example of a shape of an upper end surface of a body portion of the stud pin of an example embodiment.

As illustrated in FIG. 3B, the profile shape of the upper end surface 54a of the body portion 54 preferably has a shape similar to the configuration described above of the end surface 52a of the tip 52. FIG. 7 is a diagram for describing an example of the shape of the upper end surface 54a.

Specifically, the upper end surface 54a of the body portion 54 is provided such that the tip 52 projects therefrom and includes an upper end surface axis of symmetry 82, an upper end surface centroid 86, and an upper end surface recessed portion 92.

The upper end surface axis of symmetry 82 is the axis of line symmetry for the profile shape of the upper end surface 54a which defines the line symmetrical shape of the upper end surface 54a. The upper end surface centroid 86 is the centroid of the shape of the upper end surface 54a offset to the first side with respect to an upper end surface center position 84 on the upper end surface axis of symmetry 82 of the range the upper end surface 54a covers in the axial direction of the upper end surface axis of symmetry 82.

The upper end surface recessed portion 92 is a portion recessed inward of the upper end surface 54a, and provided on the periphery of the upper end surface 54a running between a third most distal end portion 88 located on the upper end surface axis of symmetry 82 farthest from the upper end surface centroid 86 on the first side and a fourth most distal end portion 90 located on the upper end surface axis of symmetry 82 farthest from the upper end surface centroid 86 on the second side.

The upper end surface 54a of the body portion 54 is shaped as described above to allow the upper end surface 54a to also function with respect to the road surface in a similar manner to the tip 52 when coming into contact with the road surface. Thus, the upper end surface 54a of the body portion 54 with the shape described above exhibits the same effects as the tip 52.

The stud pin 50 provided with the tip 52 and the body portion 54 is mounted in a pneumatic tire with a designated tire rotation direction. The stud pin is mounted such that the second side, as opposed to the first side, corresponds with the leading side of the tire rotation direction. According to the embodiment, such a pneumatic tire can be provided.

Experiment

To verify the effects of the embodiment, tips with various end surface shapes and stud pins were manufactured (Examples 1 to 6, Conventional Example). For the stud pins of Examples 1 to 5, the stud pin illustrated in FIGS. 3A to 3C was used and the triangular shape and trapezoidal shape of the end surface 52a was varied in size. The stud pin of the Conventional Example included an end surface of the tip with a square shape (with four rounded corner portions) and an upper end surface and lower flange of the body portion with a square shape (with four rounded corner portions). Additionally, the shape of the end surface 52a of Example 6 was the partially overlapping circular shapes illustrated in FIG. 5A, and the shape of the upper end surface 54a was the partially overlapping circular shapes similar to that of the end surface 52a, and the profile shape of the lower flange was rectangular (with four rounded corner portions). The area of the end surface was the same for the Conventional Example and all Examples.

The manufactured stud pins were mounted in the tire illustrated in FIGS. 1 and 2, and the tire was mounted on a vehicle. The tire having a tire size of 205/50R16 was mounted on a rim having a rim size of 6.5 inches and inflated with air to a pressure of 230 kPa. The vehicle used was a front wheel drive passenger vehicle (FF vehicle) with an engine displacement of 2000 cc and provided with an ABS.

To evaluate the performance of the stud pin, the vehicle described above was driven, and the braking distance on an icy road surface was measured, and amount of road surface wear was measured. Specifically, full braking was performed with the ABS active when the vehicle was driving on an icy road surface at a speed of 40 km/h, and the braking distance was measured. The amount of road surface wear was measured by measuring the difference in weight of a piece of granite placed on the road surface before and after the vehicle was driven over the granite 200 times at a speed of 100 km/h.

The evaluation results are shown in Table 1 below. The values for the evaluation results are values of the reciprocal of the braking distance and the amount of road surface wear expressed as index values with the value of the Conventional Example being assigned the value of 100. Larger index values indicate superior braking performance (performance on ice) and anti-road surface wear characteristics. "←" in Table 1 indicates that the entry is the same as the cell to the left.

TABLE 1

Figure 5:
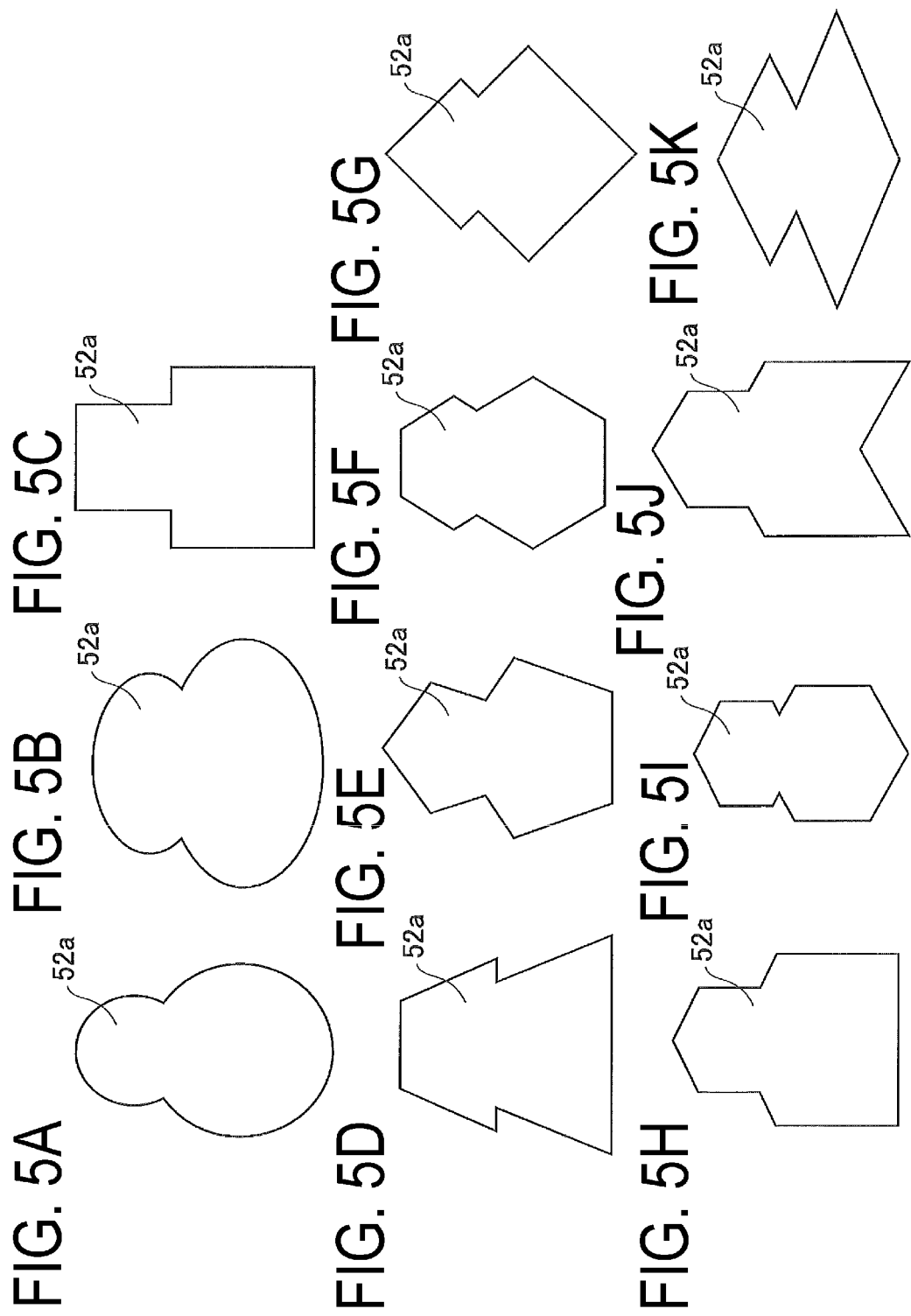
FIGS. 5A to 5K are diagrams illustrating example shapes of an end surface of the tip of an example embodiment.

|  | Conventional Example | Example 1 | Example 2 | Example 3 | Example 4 | Example 5 | Example 6 |
|---|---|---|---|---|---|---|---|
| Shape of end surface | Rectangular | FIG. 3B | ← | ← | ← | ← | FIG. 5A |
| Shape of upper end surface | Rectangular | FIG. 3B | ← | ← | ← | ← | FIG. 5A |
| Ratio L1/L2 | — | 0.8 | 1.0 | 2.0 | 5.0 | 5.2 | 1.5 |
| Braking performance | 100 | 107 | 111 | 110 | 108 | 104 | 108 |
| Anti-road surface wear characteristics | 100 | 103 | 106 | 108 | 110 | 106 | 113 |

As seen from the comparison of the Conventional Example and the Examples 1 to 6 in Table 1, the stud pin and the pneumatic tire of the embodiment provide a vehicle with excellent braking performance and reduce road surface wear.

It can also be seen that the ratio L1/L2 preferably ranges from 1.0 to 5.0.

The foregoing has been a detailed description of pneumatic tires and stud pins according to embodiments of the present technology. However, pneumatic tires and stud pins according to embodiments of the present technology are not limited to the above embodiments or examples, and may be enhanced or modified in various ways within the scope of the present technology.

The invention claimed is:

1. A pneumatic tire with a designated tire rotation direction, the pneumatic tire comprising a tread portion with a stud pin mounted in the tread portion;
the stud pin comprising:
a tip comprising an end surface having a line symmetrical shape, the end surface being configured to come into contact with a road surface, and
a body portion configured to secure the tip thereto;
the end surface of the tip configured to come into contact with a road surface comprising:
an axis of symmetry which defines the line symmetrical shape;
a centroid of a shape of the end surface offset to a first side in an axial direction of the axis of symmetry from a center position of a range on the axis the end surface covers in the axial direction;
a first most distal end portion being located on the axis of symmetry of the end surface farthest from the centroid on the first side;
a second most distal end portion being located on the axis of symmetry of the end surface farthest from the centroid on a second side opposite the first side; and
a recessed portion recessed inward of the end surface and recessed toward the axis of symmetry of the end surface, the recessed portion being provided on a periphery of the end surface running between the first most distal end portion and the second most distal end portion; wherein
the stud pin is mounted such that the second side, as opposed to the first side, corresponds to a leading side in a tire rotation direction,
two protruding portions are on each side of the axis of symmetry protruding away from the axis of symmetry, and
the recessed portion is disposed between the two protruding portions and is closer to the axis of symmetry than the two protruding portions on each side of the axis of symmetry.

2. A stud pin for mounting in a tread portion of a pneumatic tire, the stud pin comprising:
a tip comprising an end surface configured to come into contact with a road surface, and
a body portion configured to secure the tip thereto;
an end surface of the tip configured to come into contact with a road surface comprising:
an axis of symmetry which defines a line symmetrical shape of the end surface;
a centroid of a shape of the end surface offset to a first side in an axial direction of the axis of symmetry from a center position of a range on the axis the end surface covers in the axial direction;
a first most distal end portion being located on the axis of symmetry of the end surface farthest from the centroid on the first side;
a second most distal end portion being located on the axis of symmetry of the end surface farthest from the centroid on a second side opposite the first side; and
a recessed portion recessed inward of the end surface and recessed toward the axis of symmetry of the end surface, the recessed portion being provided on a periphery of the end surface running between the first most distal end portion and the second most distal end portion; wherein
two protruding portions are on each side of the axis of symmetry protruding away from the axis of symmetry, and
the recessed portion is disposed between the two protruding portions and is closer to the axis of symmetry than the two protruding portions on each side of the axis of symmetry.

3. The stud pin according to claim 2, wherein a second length of the periphery of the end surface on the second side with respect to a bottom of the recessed portion is less than a first length of the periphery of the end surface on the first side with respect to the bottom of the recessed portion.

4. The stud pin according to claim 2, wherein a first maximum width in a direction orthogonal to the axial direction of a portion of the end surface on the first side with respect to the bottom of the recessed portion is greater than a second maximum width in the direction orthogonal to the axial direction of a portion of the end surface on the second side with respect to the bottom of the recessed portion.

5. The stud pin according to claim 2, wherein a first area of the portion of the end surface on the first side with respect to the bottom of the recessed portion is greater than a second area of the portion of the end surface on the second side with respect to the bottom of the recessed portion.

6. The stud pin according to claim 2, wherein a position in the axial direction of the bottom of the recessed portion is located on the second side of the centroid.

7. The stud pin according to claim 2, wherein
a periphery shape of the end surface on the first side with respect to the bottom of the recessed portion comprises a first orthogonal line segment orthogonal to the axial direction; and a periphery shape of the end surface on the second side with respect to the bottom of the recessed portion comprises a second orthogonal line segment orthogonal to the axial direction with a length less than that of the first orthogonal line segment, or does not comprise the second orthogonal line segment.

8. The stud pin according to claim 2, wherein a first periphery shape of the end surface on the first side with respect to the bottom of the recessed portion has a shape partially identical to an enlarged shape that is enlarged, by a predetermined scale factor, from second periphery shape of the end surface on the second side with respect to the bottom of the recessed portion.

9. The stud pin according to claim 8, wherein the first periphery shape or the enlarged shape is a perfect circle, an ellipse, or a portion of a polygon.

10. The stud pin according to claim 2, wherein a distance L1 from a position in the axial direction of the bottom of the recessed portion to the first most distal end portion and a distance L2 from a position in the axial direction of the bottom of the recessed portion to the second most distal end portion have a ratio L1/L2 ranging from 1.0 to 5.0.

11. The stud pin according to claim 2, wherein
the body portion comprises an upper end surface having a line symmetrical shape provided such that the tip projects therefrom; and
the upper end surface comprises:
an upper end surface axis of symmetry which defines the line symmetrical shape, an upper end surface centroid of a shape of the upper end surface offset to the first side from a center position of a range the upper end surface covers in an axial direction of the upper end surface axis of symmetry,
a third most distal end portion being located on the upper end surface axis of symmetry farthest from the upper end surface centroid on the first side;
a fourth most distal end portion being located on the upper end surface axis of symmetry farthest from the upper end surface centroid on the second side; and
an upper end surface recessed portion recessed inward of the upper end surface, the upper end surface recessed portion being provided on a periphery of the upper end surface running between the third most distal end portion and the fourth most distal end portion of the periphery of the upper end surface.

12. The stud pin according to claim 3, wherein a first maximum width in a direction orthogonal to the axial direction of a portion of the end surface on the first side with respect to the bottom of the recessed portion is greater than a second maximum width in the direction orthogonal to the axial direction of a portion of the end surface on the second side with respect to the bottom of the recessed portion.

13. The stud pin according to claim 12, wherein a first area of the portion of the end surface on the first side with respect to the bottom of the recessed portion is greater than a second area of the portion of the end surface on the second side with respect to the bottom of the recessed portion.

14. The pneumatic tire according to claim 1, wherein the recessed portion is provided on each outer lateral side of the end surface, the lateral sides extending between the first most distal end portion on the first side and the second most distal end portion on the second side.

15. The pneumatic tire according to claim 1, wherein a width of a portion sandwiched between the pair of recessed portions in the end surface in a lateral direction perpendicular to the axial direction increases from the recessed portion on each lateral side toward the first side.

16. The stud pin according to claim 2, wherein the recessed portion is provided on each outer lateral side of the end surface, the lateral sides extending between the first most distal end portion on the first side and the second most distal end portion on the second side.

17. The stud pin according to claim 2, wherein a width of a portion sandwiched between the pair of recessed portions in the end surface in a lateral direction perpendicular to the axial direction increases from the recessed portion on each lateral side toward the first side.

18. The pneumatic tire according to claim 1, wherein both sides of the recessed portion are provided on the same side with respect to the axis of symmetry.

19. The pneumatic tire according to claim 1,
wherein the first and second most distal end portions are included in the end surface of the tip, and
wherein no portion of the end surface extends further in the axial direction on the first side than the first most distal end portion of the end surface, and no portion of the end surface extends further in the axial direction on the second side than the second most distal end portion of the end surface.

20. The stud pin according to claim 2, wherein both sides of the recessed portion are provided on the same side with respect to the axis of symmetry.

21. The stud pin according to claim 2,
wherein the first and second most distal end portions are included in the end surface of the tip, and
wherein no portion of the end surface extends further in the axial direction on the first side than the first most distal end portion of the end surface, and no portion of the end surface extends further in the axial direction on the second side than the second most distal end portion of the end surface.

22. A pneumatic tire with a designated tire rotation direction, the pneumatic tire comprising a tread portion with a stud pin mounted in the tread portion;
the stud pin comprising:
a tip comprising an end surface having a line symmetrical shape, the end surface being configured to come into contact with a road surface, and
a body portion configured to secure the tip thereto;
the end surface of the tip configured to come into contact with a road surface comprising:
an axis of symmetry which defines the line symmetrical shape;
a centroid of a shape of the end surface offset to a first side in an axial direction of the axis of symmetry from a center position of a range on the axis the end surface covers in the axial direction;
a first most distal end portion being located on the axis of symmetry of the end surface farthest from the centroid on the first side;
a second most distal end portion being located on the axis of symmetry of the end surface farthest from the centroid on a second side opposite the first side; and
a recessed portion recessed inward of the end surface and recessed toward the axis of symmetry of the end surface, the recessed portion being provided on a periphery of the end surface running between the first most distal end portion and the second most distal end portion; wherein
the stud pin is mounted such that the second side, as opposed to the first side, corresponds to a leading side in a tire rotation direction,
the end surface is asymmetrical with respect to any line other than the axis of symmetry, and the stud pin has sidewalls which are straight and parallel to the axis of symmetry.

23. A stud pin for mounting in a tread portion of a pneumatic tire, the stud pin comprising:
a tip comprising an end surface configured to come into contact with a road surface, and
a body portion configured to secure the tip thereto;
an end surface of the tip configured to come into contact with a road surface comprising:
an axis of symmetry which defines a line symmetrical shape of the end surface;
a centroid of a shape of the end surface offset to a first side in an axial direction of the axis of symmetry from a center position of a range on the axis the end surface covers in the axial direction;
a first most distal end portion being located on the axis of symmetry of the end surface farthest from the centroid on the first side;
a second most distal end portion being located on the axis of symmetry of the end surface farthest from the centroid on a second side opposite the first side; and
a recessed portion recessed inward of the end surface and recessed toward the axis of symmetry of the end surface, the recessed portion being provided on a periphery of the end surface running between the first most distal end portion and the second most distal end portion; wherein
the end surface is asymmetrical with respect to any line other than the axis of symmetry, and
the stud pin has sidewalls which are straight and parallel to the axis of symmetry.

* * * * *